United States Patent

Maehara et al.

[11] Patent Number: 6,043,632
[45] Date of Patent: Mar. 28, 2000

[54] GENERATING SYSTEM INCLUDING GENERATOR HAVING PERMANENT MAGNET

[75] Inventors: Fuyuki Maehara; Yasuhiro Takase, both of Kariya; Wakako Kanazawa, Toyokawa; Tadatoshi Asada, Anjo; Hiroaki Ishikawa, Nagoya; Toshinori Maruyama, Anjo, all of Japan

[73] Assignee: Denso Corporation, Kariya, Japan

[21] Appl. No.: 08/869,888

[22] Filed: Jun. 5, 1997

[30] Foreign Application Priority Data

Jun. 5, 1996 [JP] Japan .................................. 8-143050
May 12, 1997 [JP] Japan .................................. 9-121150

[51] Int. Cl.$^7$ ...................................................... H02P 9/14
[52] U.S. Cl. .............................................. 322/28; 322/33
[58] Field of Search ................................ 322/28, 46, 57, 322/33; 310/263; 318/521

[56] References Cited

U.S. PATENT DOCUMENTS

| | | | |
|---|---|---|---|
| 3,721,860 | 3/1973 | Phinney | 317/80 |
| 3,866,110 | 2/1975 | Ruggeri | 322/57 |
| 4,739,243 | 4/1988 | Iwatani et al. | 322/10 |
| 5,198,744 | 3/1993 | Kohl et al. | 322/33 |
| 5,206,580 | 4/1993 | Okamoto et al. | 322/46 |
| 5,306,977 | 4/1994 | Hayashi | 310/263 |
| 5,397,975 | 3/1995 | Syverson | 322/46 |
| 5,502,368 | 3/1996 | Syverson et al. | 322/28 |
| 5,656,922 | 8/1997 | LaVelle et al. | 322/46 |

FOREIGN PATENT DOCUMENTS

| | | |
|---|---|---|
| 0 041 829 | 12/1981 | European Pat. Off. . |
| 210 819 | 2/1987 | European Pat. Off. . |
| 0636869 | 2/1995 | European Pat. Off. . |
| 58-66538 | 4/1983 | Japan . |
| 60-51421 | 3/1985 | Japan . |
| 61-85045 | 4/1986 | Japan . |
| 64418 | 1/1994 | Japan . |
| 6217411 | 8/1994 | Japan . |
| 640 089 | 12/1983 | Switzerland . |
| 2 027 284 | 2/1980 | United Kingdom . |
| 95/00996 | 1/1995 | WIPO . |
| 96/30992 | 10/1996 | WIPO . |

OTHER PUBLICATIONS

Patent Abstracts of Japan, vol. 96, No. 7, Mar. 1996 re JP 08/079909.
Patent Abstracts of Japan, vol. 11, No. 198, (E–519) Jan. 1987 re JP 62/023400.
Patent Abstracts of Japan, vol. 18, No. 583, (M–1699) Aug. 1994 re JP 06/217411.

*Primary Examiner*—Nicholas Ponomarenko
*Attorney, Agent, or Firm*—Pillsbury Madison & Sutro LLP

[57] ABSTRACT

A permanent magnet made of ferrite magnet material used for a generator may be irreversibly demagnetized by a factor such as current supplied to a field coil, temperature of the permanent magnet and/or output current of an armature coil. When the field current exceeds a preset value, and also the output current exceeds a preset value, the field current is limited to prevent the irreversible demagnetization. Thus, the irreversible demagnetization of the permanent magnet can be prevented, while ensuring a sufficient amount of the output power. It is also effective that the field current or armature current is limited when the temperature of the permanent magnet is in a range of possible irreversible demagnetization.

22 Claims, 14 Drawing Sheets

6,043,632

GENERATING SYSTEM INCLUDING GENERATOR HAVING PERMANENT MAGNET

BACKGROUND OF THE INVENTION

1. Field of the Invention

The present invention relates to a generating system including a generator having a permanent magnet disposed in the magnetic field.

2. Description of the Related Art

As a magnetic field control system of a vehicular generator, field current control technology for controlling the output power of a generator is well known. JPA 58-66538 proposes to reduce engine loads by controlling the field current for a limited time after the engine starts and the generator output voltage is generated. JPB2-6-38720 proposes to reduce the engine loads by controlling the field current to a limited value while the generator is still cool.

A vehicular generator having both permanent magnets and field coil is also well-known. For example, a permanent magnet generator which is composed of a magnetic core having a plurality of claw poles and a plurality of permanent magnets disposed between the adjacent claw poles is proposed to increase the magnetic flux interlinking the armature coils. A tandem-type generator which is composed of a rotor having field coil and a rotor having permanent magnets is also proposed. A field-coil-permanent-magnet-combined generator, in which the field coil is energized in the direction to offset the magnetic field of the permanent magnets in order to reduce the iron loss and the engine load, is also proposed in JPA 6-217411.

A vehicular generator provided with permanent magnets for supplying the magnetic field without a field coil (or permanent magnet generator) is also well-known.

In the above mentioned permanent magnet generator and field-coil-permanent-magnet-combined generators, the magnetic field (or outside magnetic field) generated by the armature coil or the field coil is apt to demagnetize the permanent magnet. That is, when the output current or the field current increases, the outside magnetic field strength may increase to an amount to irreversibly demagnetize the permanent magnet, thereby reducing the output power of the generator.

SUMMARY OF THE INVENTION

The present invention is to provide an improved generating system including a generator having a permanent magnet which is free from demagnetization and generates sufficient output power.

According to the present invention, a generating system including a generator having a permanent magnet, a field coil, an armature coil, and a voltage regulator, a current limiting unit for limiting the field current within an allowable amount that may not cause the irreversible demagnetization.

The limiting of field current makes the permanent magnet compact in size and low in cost and enables to design the permanent magnet with ease.

The prevention of demagnetization mentioned here includes partial prevention which allows an insignificant demagnetization as well as complete prevention. The demagnetization of the permanent magnet means decrease in the coercive force of a portion of the magnet as well as the whole magnet. The insignificant demagnetization can be allowed if it is not detrimental to the output power, efficiency or other factors of performance of a generator. The degree of allowable demagnetization depends on the design concept or capacity of the generator.

For example, in a field-coil-permanent-magnet-combined-type generator described later, the irreversible demagnetization is recognized if 5% or more of a difference in the output current under the same operating condition including a field current and a rotation speed between a generater from which the permanent magnet is removed and a generator with the permanent magnet is detected.

The limiting of current to prevent the irreversible demagnetization varies with material of the permanent magnet, the shape thereof and temperature.

According to another feature of the present invention, the generating system further includes means for detecting an indication related to the irreversible demagnetization. The current limiting unit limits the field current according to the indication.

Possible factors of the irreversible demagnetization are detected to carry out the limiting of current. Accordingly, the field current is limited if the detected amounts may cause the irreversible demagnetization. Otherwise, the field current is supplied to a maximum level. Therefore, the efficiency of the coil may not be lowered by the limiting of current.

According to another feature of the present invention, the means for detecting an indication includes means for detecting temperature of the permanent magnet, and the current limiting unit reduces the field current as the temperature becomes lower.

Thus, the field current is controlled in response to change in the B-H curve of the permanent magnet so that the irreversible demagnetization is prevented surely.

For example, in a vehicular generator which may used at temperatures higher than the ambient temperature, the limiting of current is carried out at temperatures lower than 60° C. Such temperature can be selected to be lower than 0° C., or −20° C. The limiting of current provides the generator which operates without limiting of current at comparatively high temperatures of frequent use without the limiting of current, which enables use of the ferrite permanent magnet.

According to another feature of the present invention, the means for detecting an indication includes means for detecting temperature of a voltage regulator fixed to the generator.

According to another feature of the present invention, the means for detecting an indication includes means for detecting passing time after generation of the generator. The temperature of the permanent magnet can be estimated from temperature of a portion other than the permanent magnet if the passing time is taken into account.

According to another feature of the present invention, the means for detecting an indication includes means for detecting output current of the generator, and the current limiting unit reduces the field current when the output current increases to a level that may cause the irreversible demagnetization. That is, an amount related to the output current is detected so that the strength of the outside magnetic field is estimated, thereby deciding necessity of the limiting of the current and amount of the field current to be limited.

According to another feature of the present invention, the means for detecting an indication includes means for detecting rotation speed of the generator, and the current limiting unit reduces the field current when the rotation speed increases.

According to another feature of the present invention, the current limiting unit limits the field current within a maximum field current of the generator which operates at a highest operating temperature.

In a vehicular generator, which is used in a wide range of the ambient temperature, the field current is controlled to control the output power or torque. For example, the field current is apt to increase as the resistor of the field coil at a cold temperature reduces. In order to prevent the torque from becoming excessive, the field current is limited within current supplied at a highest operating temperature of the generator.

According to another feature of the present invention, the current limiting unit comprises a switch for on-off-controlling the field current according to the indication.

The field current is controlled to a desired level by a simple structure, and the pulsation of the field current caused by on-off control heats the rotor poles in a short time. As a result the permanent magnet disposed closely to the rotor poles and thermally connected thereto can be heated in a short time.

According to another feature of the present invention, the voltage regulator includes the above switch and controls output voltage of the generator to a preset value by controlling duty ratio of the switch, the means for detecting an indication detects the field current and duty ratio of the switch, and the current limiting unit limits the field current within an amount of the field current that can prevent irreversible demagnetization according to the duty ratio.

The duty ratio of the switch is adopted as the indication related to the temperature of the magnet. In other words, the temperature of the permanent magnet has close relationship with the rotor. Since the temperature of the rotor is related closely to the above duty ratio, no specific temperature detector is necessary.

According to another feature of the present invention, the current limiting unit limits an increasing rate of the duty ratio according to an increased rate of the field current.

Thus, the duty ratio can be used to estimate the temperature of the permanent magnet.

According to another feature of the present invention, the means for detecting an indication comprises means for detecting a voltage drop of the field coil when the switch turns on, and the current limiting unit limits the field current according to temperature which is estimated from the duty ratio, field current and the voltage drop.

The temperature of the field coil is estimated from the duty ratio, field current and voltage drop of the field coil.

According to another feature of the present invention, the current limiting unit reduces the field current more as the estimated temperature lowers.

According to another feature of the present invention, a generating system including a generator having a permanent magnet, an armature coil, a current limiting unit for limiting current of the armature coil within such an allowable amount as not cause irreversible demagnetization.

The current of the armature coil is limited to an amount not to cause the irreversible demagnetization of the permanent magnet when the current increases to a preset amount.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Preferred embodiments of the present invention is described hereafter.

First Embodiment

Figure 1:
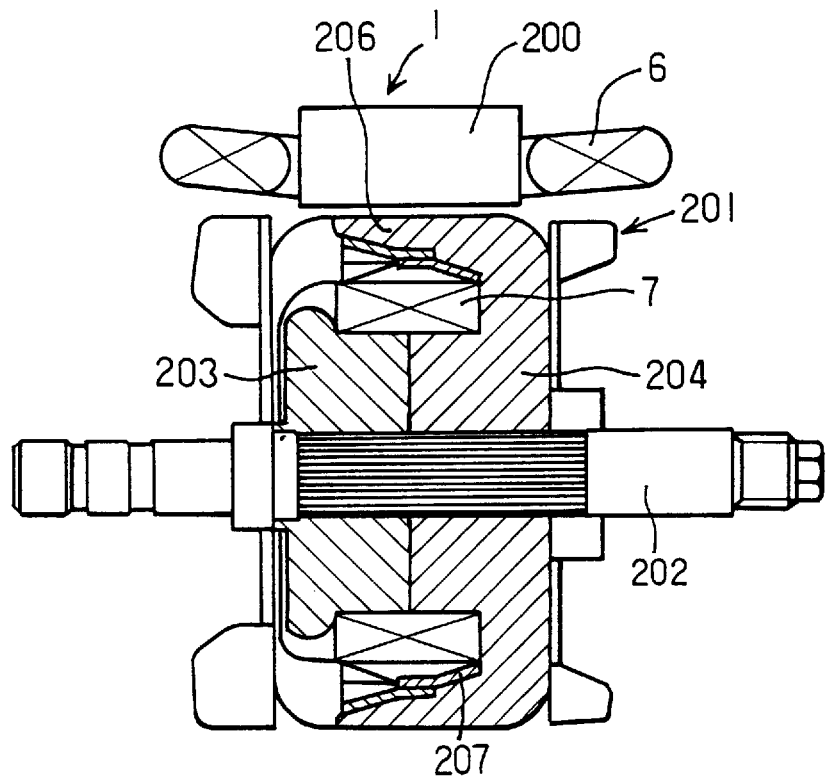
FIG. 1 is a cross-sectional side view illustrating a main portion of a generator according to a first embodiment of the present invention.
Figure 2:
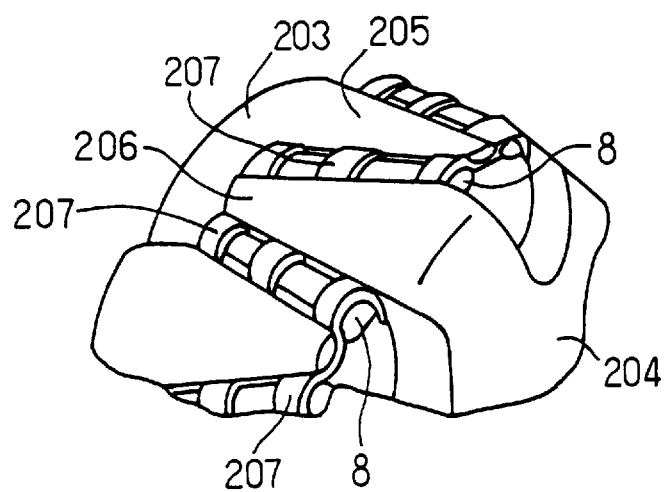
FIG. 2 is a perspective view illustrating a main portion of the generator shown in FIG. 1.
Figure 3:
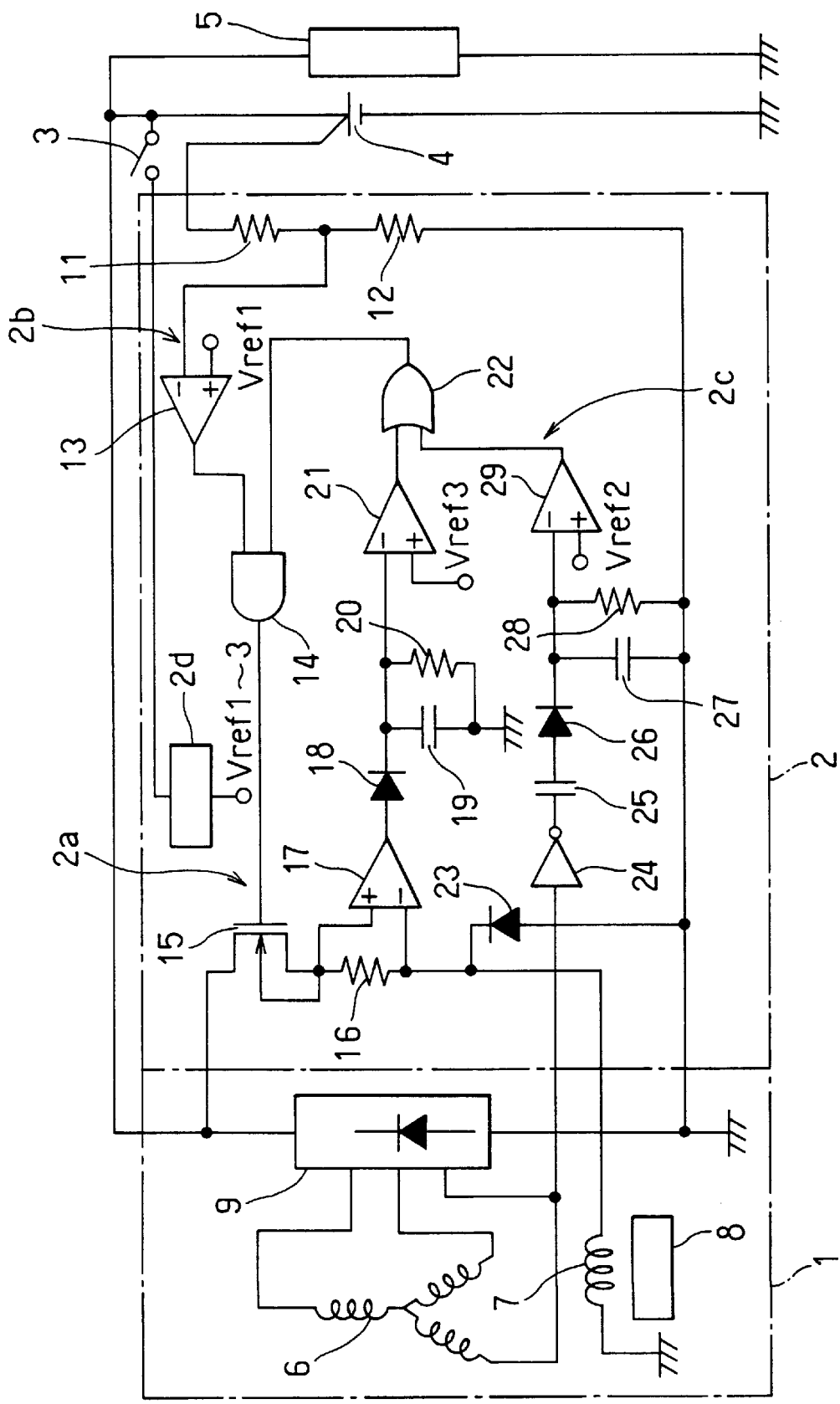
FIG. 3 is a circuit diagram of a generating system according to the first embodiment.

A vehicular battery charging system including a generator according to a first embodiment of the present invention is described with reference to FIGS. 1–3. A vehicular generator 1 driven by an engine of a vehicle is described first with reference to FIGS. 1 and 2.

The vehicular generator 1 is a three-phase AC synchronous generator, which includes a stator core 200 having an armature (or stator) coil 6 and a rotor 201 disposed inside the stator 200. The rotor 201 is composed of a rotary shaft 202, a pair of front and rear cores 203 and 204 fitted to the shaft 202 side by side in the axial direction and a field coil 7 wound at the center of the cores 203 and 204. A plurality of claw poles 205 extend from the front core 203 over the field coil at equal intervals on the circumference thereof and a plurality of claw poles 206 extend from the rear core 204 over the field coil 7 at equal intervals on the circumference thereof. When the field coil 7 is energized, the claw poles 205 are magnetized to form N-pole and the claw poles 206 are magnetized to form S-pole.

The claw poles 205 and 206 are disposed so that one claw poles shift by a half pitch in the circumferential direction from the other claw poles. Each one of permanent magnets 8 is disposed in a space between adjacent ones of the claw poles 205 and 206 and is held by an annular holder plate 207. The side of the permanent magnets 8 adjacent to the claw poles 205 are magnetized to form N-pole, and the other side thereof adjacent to the claw poles 206 are magnetized to form S-pole. In this embodiment, the permanent magnets 8 are made of ferrite magnet material. The field coil 7 is supplied with current controlled by a MOS-transistor 15, and the voltage generated in the armature coil 6 is rectified by a rectifier 9 and supplied to a battery 4 and an electric load 5.

A reference numeral 2 denotes a voltage regulator, which is composed of a field coil driving circuit 2a, a voltage regulating circuit 2b, a demagnetization-prevention circuit 2c and a reference voltage generating circuit 2d. The voltage regulator 2 regulates the output voltage to a suitable level for charging the battery by on-off switching of the field current.

The field coil driving circuit 2a is composed of an N-channel power MOS-transistor 15, a field-current-detecting resistor 16 and a flywheel diode 23. The MOS-transistor 15 has the drain which is connected to the output terminal of the rectifier 9 and the source which is grounded through the resistor 16 and field coil 7.

The voltage regulating circuit 2b is composed of a series circuit of resistors 11 and 12 which provides a divided voltage of the battery voltage at the junction point thereof and a comparator 13 which compares the divided voltage of the battery voltage with a reference voltage Vref1 and sends a resultant signal to the MOS-transistor 15 through an AND gate 14. If the AND gate 14 has a Hi-level signal at another input terminal, the MOS-transistor 15 is on-off controlled by the comparator 13 to control the field current so that the divided voltage of the battery voltage can be equalized to the reference voltage Vref1.

The reference voltage generating circuit 2d is a constant voltage circuit which provides the reference voltage Vref1, and reference voltages Vref2 and Vref3, which are described later.

The demagnetizing-prevention circuit 2c is composed of a field-current limiting circuit, a high-rotation-speed detecting circuit (described later), an OR gate 22 and the AND gate 14.

The field-current limiting circuit is composed of a differential amplifier 17, a diode 18, a parallel circuit of capacitor 19 and a resistor 20 and a comparator 21. A voltage drop of the field-current detecting resistor 16 is amplified by the differential amplifier 17, and a peak of the voltage proportional to the field current is applied to the capacitor 19 through the diode 18. The capacitor 19 discharges the electric charge through the resistor 20 after the voltage proportional to the field current reduces. The diode 18, capacitor 19 and resistor 20 form a hold circuit holding the input voltage.

The terminal voltage (voltage proportional to the field current) of the capacitor 19 is compared with the reference voltage Vref3 by a comparator 21, which applies a Lo-level signal to the AND gate 14 through an OR gate 22 if the voltage proportional to the field current is higher than the reference voltage Vref3 (the field current is larger than a predetermined amount).

A high-speed detecting circuit has a f-V converter composed of a wave-shaping inverter 24, a capacitor 25, a diode 26 and a capacitor 27, a resistor 28 and a comparator 29. Voltage generated at one of phase terminals of the armature coil 6 is wave-shaped into a binary-coded pulse signal by the inverter 24 which has a threshold value. The pulse signal is differentiated by the capacitor 25 and the rising and falling edges of the signal are converted into positive and negative pulse signals, and only the positive signal is introduced by the diode 26 to a smoothing circuit composed of the capacitor 27 and resistor 28, which applies a rectified DC voltage to the comparator 29.

The voltage of the capacitor 27, which is proportional to the generator rotation speed, is compared with the reference voltage Vref2 by the comparator 29. The comparator 29 applies a Lo-level signal to the OR gate 22 if the voltage of the capacitor 27 is higher than the reference voltage Vref2 and applies a Hi-level signal thereto if the voltage of the capacitor 27 is lower than the reference voltage Vref2. The voltage of the capacitor 27 or the rotation speed of the generator has a positive correlation with the output current of the stator coil 6 when the field current is unchanged.

The OR gate 22 applies a Lo-level signal to the AND gate 14 if both the rotation speed of the generator and field current exceed preset values. In other words, if both the field current and the output current become higher or larger than preset values, the MOS-transistor 15 is turned off to limit the field current; if either one of the output current and the field current becomes lower than the corresponding one of the above mentioned reference values, a Hi-level signal is applied to the AND gate 14 so that the field current can be fully controlled at the conduction rate from 0% to 100% to regulate the battery voltage to a suitable level.

As described above if the field current exceeds a preset value corresponding to the reference voltage Vref3 and if the maximum output current which is related to the rotation speed exceeds a preset value corresponding to the reference voltage Vref2, the field current is controlled not to exceed the above preset value. The reference voltages Vref2 and Vref3 are set as follows.

The extent of the irreversible demagnetizing of the permanent magnet 8 is related to the strength of the demagnetizing field, in other words, the output current and the field current of the generator at the ambient temperature. The reference voltage Vref3 is set to a value corresponding to a maximum field current of the generator that does not cause the irreversible demagnetization, the reference voltage Vref2 is set to a value corresponding to a rotation speed of the generator where the maximum output current of the generator with the above maximum field current does not cause the irreversible demagnetization.

If the rotation speed of the generator is low and the output current is small, the permanent magnets 8 are not subject to a strong magnetic field causing the irreversible demagnetization. Therefore, the field current and also the output current are supplied to the field coil and the electric load 5, respectively, without limitation. On the other hand, if the generator rotation speed exceeds a preset speed and the output current increases to such a level that the magnetic field may cause the irreversible demagnetization of the permanent magnets 8, the field current is reduced to a level that may not cause the irreversible demagnetization even under a maximum output current, which decreases as the field current is reduced, and the ambient temperature.

The permanent magnets 8 may be demagnetized irreversibly if the field current and the output current are not controlled or the ambient temperature becomes abnormal. The current control stated above can increase the degree of freedom in designing the permanent magnets 8.

The permanent magnets 8 are preferably made of ferrite magnet material. The magnet made of ferrite magnet material, which is generally demagnetized at low temperatures such as below-zero temperature or 20° C. below zero, is expected to operate within temperature range from −40° C. to 200° C. The embodiments of the present invention provide simple control of the current to prevent the irreversible demagnetization by adjusting the circuit constants (reference voltages Vref2 and Vref3).

Second Embodiment

Figure 4:
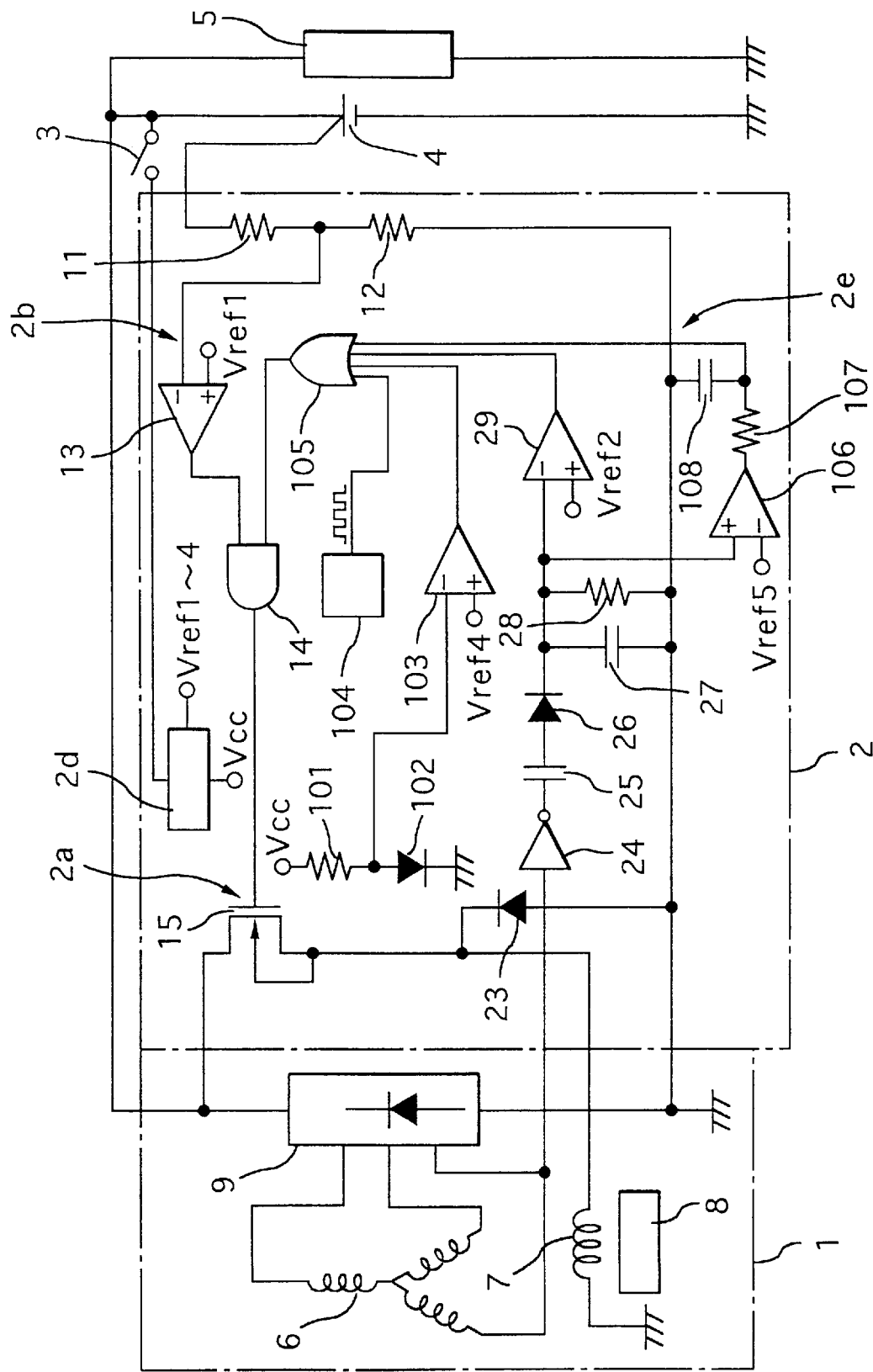
FIG. 4 is a circuit diagram of a generating system according to a second embodiment of the present invention.

Another embodiment is described with reference to FIG. 4.

The circuit of this embodiment is the same as the circuit of the first embodiment except that a demagnetizing-prevention circuit 2e is substituted for the demagnetizing-prevention circuit 2c.

The demagnetizing-prevention circuit 2e is composed of a temperature detecting circuit, a high-speed detecting circuit, a circuit for detecting time after start of generation (hereinafter referred to as the time detecting circuit), an oscillation circuit 104, an OR gate 105 and the AND gate 14.

The temperature detecting circuit has a junction diode 102 with the cathode which is grounded and the anode to which a constant source voltage is applied. The anode potential has a negative correlation with the temperature and is compared with a reference voltage Vref4 by a comparator 103. When the diode 102 is heated to a certain temperature and the anode potential becomes lower than the reference voltage Vref4, the comparator 103 applies a Hi-level voltage to the OR gate 105. The voltage regulator 2, which includes the diode 102, is fixed to the housing of the generator 1. If the generator 1 starts generation and the permanent magnets 8 are heated by the iron loss and copper loss of the rotor for a while, the temperature of the diode 102 increases so that the output signal of the comparator 103 changes from a Lo-level signal to a Hi-level signal. As a result, the diode 102 delays in detecting the temperature of the permanent magnets 8.

The structure and operation of the high-speed detecting circuit is the same as that of the first embodiment, and the description is omitted.

The time detecting circuit has a comparator 106 which compares the potential of the capacitor 27 of the high-speed detection circuit with a reference voltage Vref5. The output terminal of the comparator 106 is grounded through a series circuit of a resistor 107 and a capacitor 108. The resistor 107 and the capacitor 108 form an integrating circuit, and the high-side terminal of the capacitor 108 applies an integrated value of the output voltage of the comparator 106 to the OR gate 105. The integrating circuit is a delay circuit. If voltage of the capacitor 27 becomes higher than the reference voltage Vref5, the comparator 106 charges the capacitor 108, judging that the generation is started. The capacitor 108 applies a Lo-level signal to the OR gate 105 until a certain delay time has passed and, thereafter, applies a Hi-level signal.

The oscillation 104 applies rectangular pulses to the OR gate 105 at a preset cycle. The OR gate 105 applies the rectangular pulses to the AND gate 14 only when the comparators 103, 29 and the capacitor 108 send Lo-level signals to the OR gate 105. As a result, even if the comparator 13 provides a Hi-level signal, the duty ratio of the MOS transistor 15 is decided by the rectangular pulses.

After all, in order that the OR gate 105 can limit the field current, the comparator 103 provides a Lo-level signal (field-current limiting signal) when the temperature of the permanent magnets 8 is detected by the diode 102 to be lower than a preset value, the comparator 29 provides a Lo-level signal (field-current limiting signal) when the generator runs at a speed where the output current may exceed a preset value, and the capacitor 108 provides a Lo-level signal (field-current limiting signal) for a certain delay time after start of the generation.

In other words, in this embodiment, the field current is limited only when the temperature of the permanent magnets 8 detected by the diode 102 is lower than a preset temperature (e.g. low temperature before the generation), when the rotation speed is higher than a preset speed where the output current may exceed a preset amount, and for a preset period after the start thereof.

In this embodiment, the voltages of the diode 102 and the capacitor 108 relate to the temperature of the permanent magnets 8, and the threshold level of the OR gate 105 is the level (a voltage level which may not cause the irreversible demagnetization when the output current and the field current are maximum) to judge the voltage of the capacitor 108.

According to this embodiment, field current is limited within a period after the generation only when the temperature of the diode 102 is low (that is, the temperature long enough after the last operation), and the rotation speed is higher than a preset value (where the output current may exceed a preset value). Thus, the current control is carried out only when the irreversible demagnetization can be expected. That is, more frequent full power operation can be carried out. Moreover, it is not necessary to design permanent magnets 8 specific to the cold-weather operation.

The delay time provided by the delay circuit composed of the resistor 107 and capacitor 108 is set to 1–2 minutes, in which the permanent magnets 8 made of ferrite magnet material are heated, due to the iron and copper loss, to a level which does not require the current imitation.

The reference voltage Vref4 corresponds to the diode's temperature of 20°0 C. If the temperature of the permanent magnets 8 is about this temperature, the field current limitation is not carried out irrespective of the signal of the delay circuit.

The reference voltage Vref5 is sufficient if it can discriminate whether the rotation speed becomes as high as a preset level, or the generation starting level.

Third Embodiment

A third embodiment is described with reference to FIG. 5 and 6. In this embodiment, the main portions of the regulator 2 is composed of a microcomputer 300, a multiplexer 301, an A/D converter 302 and a CMOS inverter 303, and the permanent magnets 8 are made of neodymium magnet material.

The temperature detecting circuit, which is composed of the series-connected resistor 101 and diode 102, is the same as that of the first embodiment. The output voltage of the temperature detecting circuit is applied to the microcomputer 300 through the multiplexed 301 and A/D converter 302 together with the output voltage (or battery voltage) Vb of the battery voltage dividing circuit composed of the resistors 11 and 12 and the voltage V at one of the phase terminal.

The operation of the above microcomputer 300 is described with reference to a flow chart shown in FIG. 6.

In a step S100, the generator voltage V, battery voltage Vb, temperature T are read. The multiplexer 301 sends digital signals, in a short time, indicating the generator voltage V, battery voltage Vb and temperature T to the microcomputer 300 in response to selecting signals from the microcomputer 300. The step S100 can be added as an interruption routine which is executed regularly in a short period, and mean values of the generator voltage, battery voltage and temperature are calculated from the signals obtained in succession. Thus, high frequency noises can be reduced.

In the next step S102, the output current is calculated from the generator voltage V and battery voltage Vb.

In more detail, the generator voltage V is divided by the resistors 11 and 12 to obtain a divided voltage (hereinafter referred to as the generator voltage V). A difference between the generation voltage V and battery voltage Vb, (V−Vb), is equal to the sum of a voltage drop of the high-side diode of the rectifier 9 and a voltage drop of a line 310 if the generator voltage V is a value (e.g. 0.65 V) higher than the battery voltage. The difference (V−Vb) is closely related to the output current I of the generator 1. This relationship is stored in a memory beforehand to obtain the output current from the difference (V−Vb).

In the next step S104, a duty ratio of the MOS transistor 15 is obtained from the temperature T and output current I.

The permanent magnet 8 is irreversibly demagnetized if the strength of the composite magnetic field caused by the output current I and the field current IF exceed a critical demagnetization strength of the permanent magnets 8, which varies as temperature changes. Accordingly, the relationship of the output current I, temperature T and the maximum duty ratio Dmax of the MOS transistor 15 which corresponds to the field current causing the irreversible demagnetization is stored in a memory as a table beforehand. Thus, the maximum duty ratio Dmax can be obtained from the output current I and temperature T.

In a step S106, whether or not the battery voltage Vb is lower than the reference voltage Vref1 is examined, and set the duty ratio D less than Dmax' (which is Dmax−ΔD) if the result is YES. Otherwise, the duty ratio D is set to 0 and the duty ratio is applied to a register (not shown) in a step S112. ΔD is set according to a test result. The microcomputer 300 applies a PWM signal having the duty ratio D to the gate of the MOS transistor 15.

Thus, the field current control can be carried out with the controlled field current which is less than the critical demagnetizing current.

Variation

The present invention can be applied to a tandem-field-type generator in which the permanent magnet poles and field-coil-type poles are disposed side by side in the axial direction so that magnetic flux formed by the poles of both types can interlink a common armature coil separately.

In the tandem-field-type generator, the field current is limited to change the output current to limit the outside magnetic field which may demagnetize the permanent magnets.

The output current of the generator can be detected directly and controlled within a level that does not cause the irreversible demagnetization.

The temperature of the permanent magnets 8 is detected or estimated to limit field current or output current.

The above embodiments can be combined with another current limiting device such as controls the field current within an amount of current that is maximum in view of the thermal breakdown or controls the rush current of the field current.

Fourth Embodiment

Figure 7:
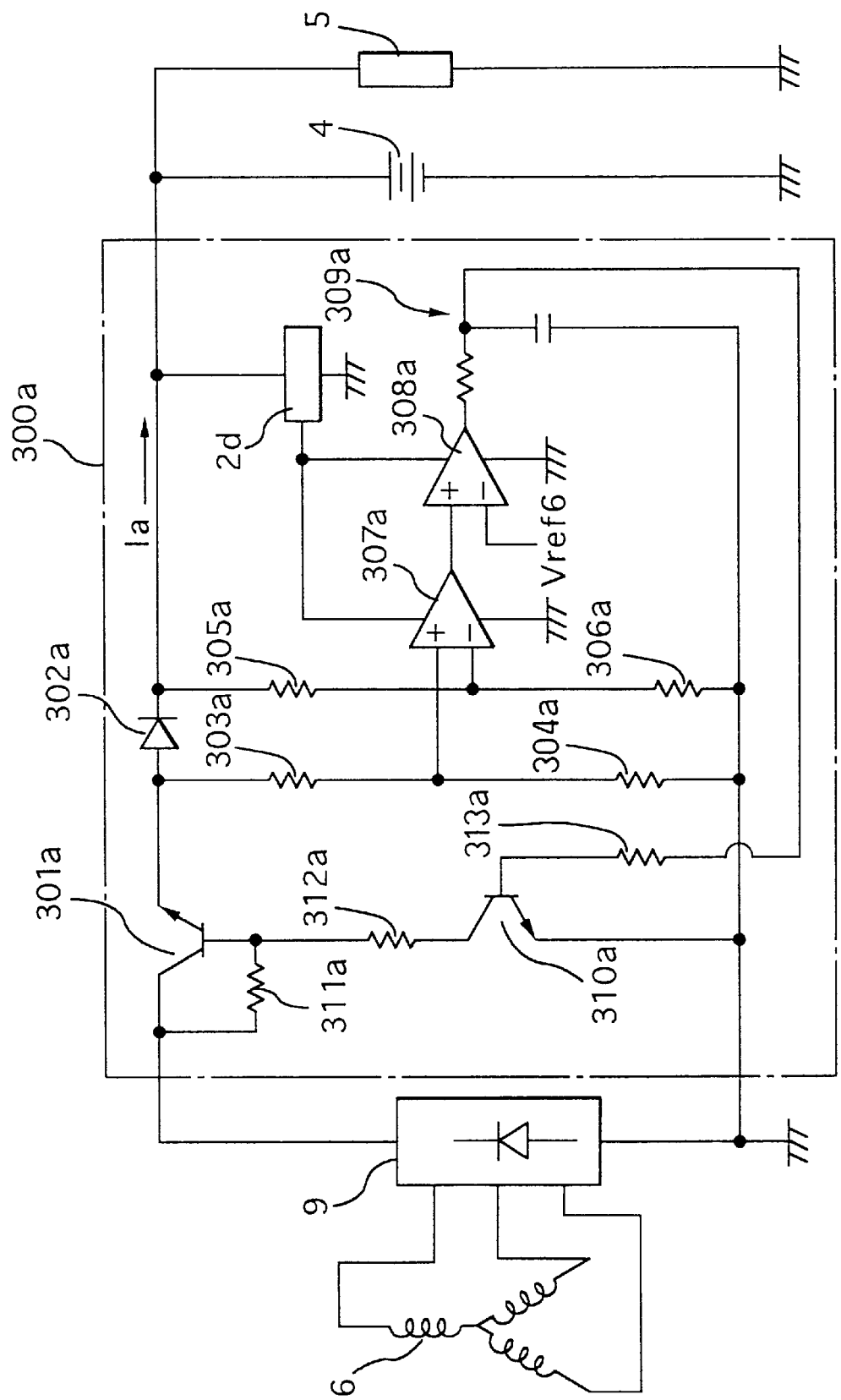
FIG. 7 is a circuit diagram of a generating system according to a fourth embodiment of the present invention.

A fourth embodiment is described with reference to FIG. 7.

This embodiment is to prevent the irreversible demagnetization of the permanent magnets 8 of a permanent magnet generator by limiting the output current thereof. A reference numeral 300a is a circuit for preventing the demagnetization.

The output current of the armature coil 6 of the permanent magnet generator is rectified by the three-phase full-wave rectifier 9 and supplied to the battery 4 and electric load 5 through an NPN emitter-follower transistor 301a and a reverse-voltage-protecting diode 302a.

Reference numerals 303a–306a denote resistors for dividing the voltage drop of the diode. The divided voltage of the voltage drop is amplified by a differential amplifier 307a and compared with a reference voltage Vref6 by a comparator 308a. The output of the comparator 308a is applied to the base of an emitter-grounded NPN transistor 310a through an RC low-pass filter 309a for stabilizing the output so that the transistor 310a controls the transistor 301a to turn on or off. The base current of the transistor 301a is supplied through a resistor 311a. Reference numerals 312a and 313a are resistors for setting the transistors to be operative. A constant voltage circuit 2d supplies electric power of a constant voltage to the differential amplifier 307a and the comparator 308a.

The voltage drop of the diode 302a is related to output current Ia. The comparator 308a provides a Lo-level signal if the voltage drop of the diode 302a exceeds a preset level corresponding to the reference voltage Vref6. The reference voltage Vref6 is decided beforehand so that the output current does not exceed an amount to cause the irreversible demagnetization. Consequently, the transistor 310a is turned on, and the transistor 301a is turned off to interrupt the output current Ia for a period decided by the low-pass filter 309a.

Thus, the irreversible demagnetization can be prevented even if the magnetomotive force of the armature coil 6 is substantial as compared with the coercive force of the permanent magnet, or even if a large amount of current due to some trouble such as short circuiting is going to flow.

In the above circuit, the low-pass filter 309a can be omitted. The transistor 301a and diode 302a can be omitted if some or all diodes of the three-phase full-wave rectifier 9 are changed to transistors to switch on and off instead of the transistor 301a.

It is possible to limit the output current Ia by detecting the temperature of the permanent magnets 8 and the output current Ia.

Fifth Embodiment

Another embodiment is described with reference to FIGS. 8–12.

Figure 5:
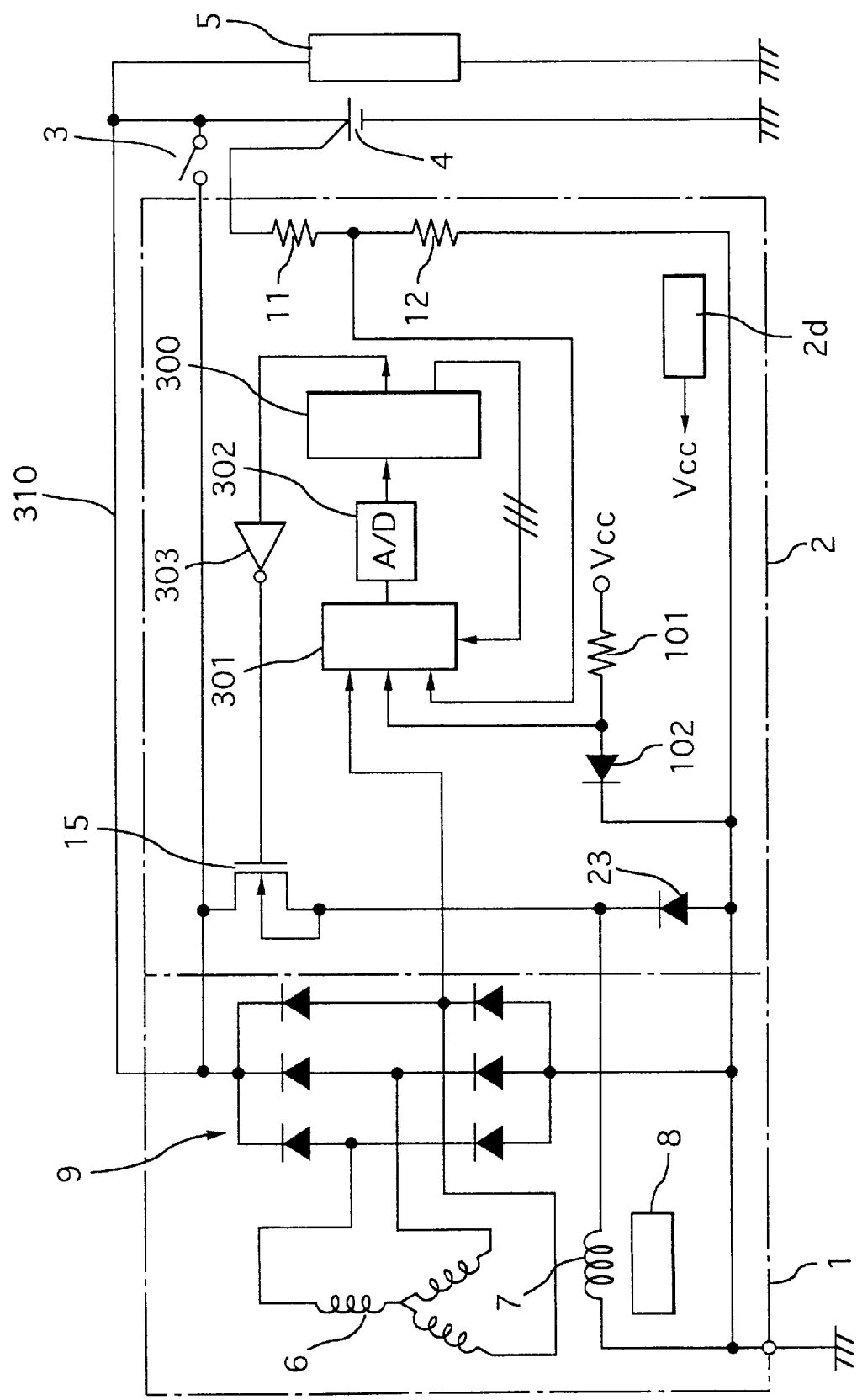
FIG. 5 is a circuit diagram of a generating system according to a third embodiment of the present invention.
Figure 6:
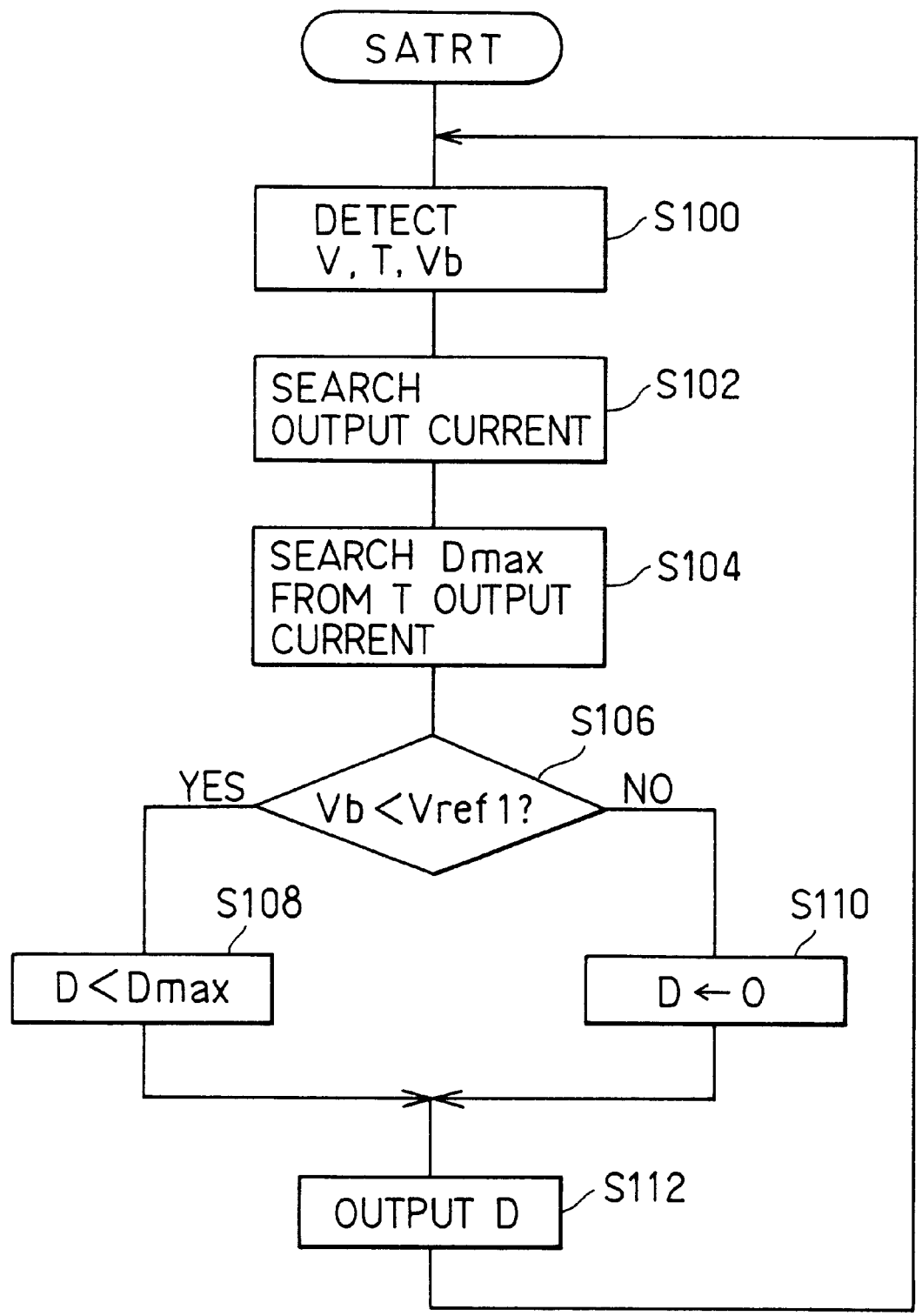
FIG. 6 is a flow chart showing operation of a microcomputer shown in FIG. 5.

In this embodiment, some portions shown in FIG. 5 are changed. A voltage corresponding to the field current which is detected by the comparator 17, a voltage of the capacitor 27 corresponding to the rotation speed, a voltage drop of the diode 102 corresponding to the temperature are introduced cyclically by the circuits already described with reference to FIGS. 3 and 4 to the microcomputer 300 through a multiplexed circuit 301b and the A/D converter 302. The microcomputer 300 controls the MOS transistor 15 via the inverter 303, on-off-controlling the field current.

Figure 9:
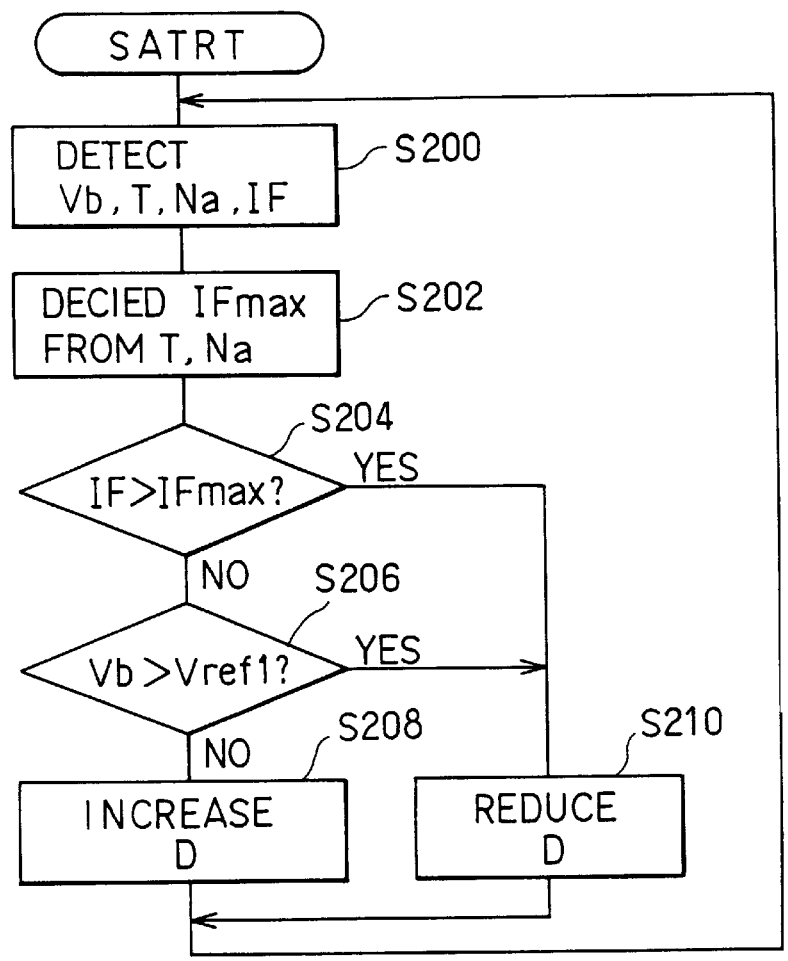
FIG. 9 is a flow chart showing operation of the microcomputer.

The operation of the microcomputer 300 is described with reference to a flow chart shown in FIG. 9.

In a step S200, the battery voltage Vb, temperature T, Rotation speed Na of the generator and the field current IF are read.

In the next step S202, the temperature T and rotation speed Na are applied to a table which is stored beforehand to obtain a maximum allowable field current IFmax, which is smaller than a critical demagnetizing current IFcr which may cause the irreversible demagnetization with the temperature T and rotation speed Na.

In the next step S204, the field current IF is compared with the maximum allowable field current IFmax. If the field current IF is larger than the maximum allowable field current IFmax, the duty ratio of the transistor 15 for PWM-controlling the field current is lowered by a preset value irrespective of the battery voltage Vb (S210). Otherwise, the battery voltage Vb is compared with a reference voltage Vref1 (S206). If the battery voltage Vb is higher than the reference voltage Vref1, the duty ratio D is reduced (S210). Otherwise, the duty ratio D is increased (S208).

The above routine is repeated to maintain the field current (less than the maximum allowable field current IFmax) within a value not to cause the irreversible demagnetization under the temperature T and the rotation speed Na. As a result, the field current IF can be changed as the maximum allowable field current IFmax changes so that the demagnetization can be prevented by the least control of the field current IF.

Figure 10:
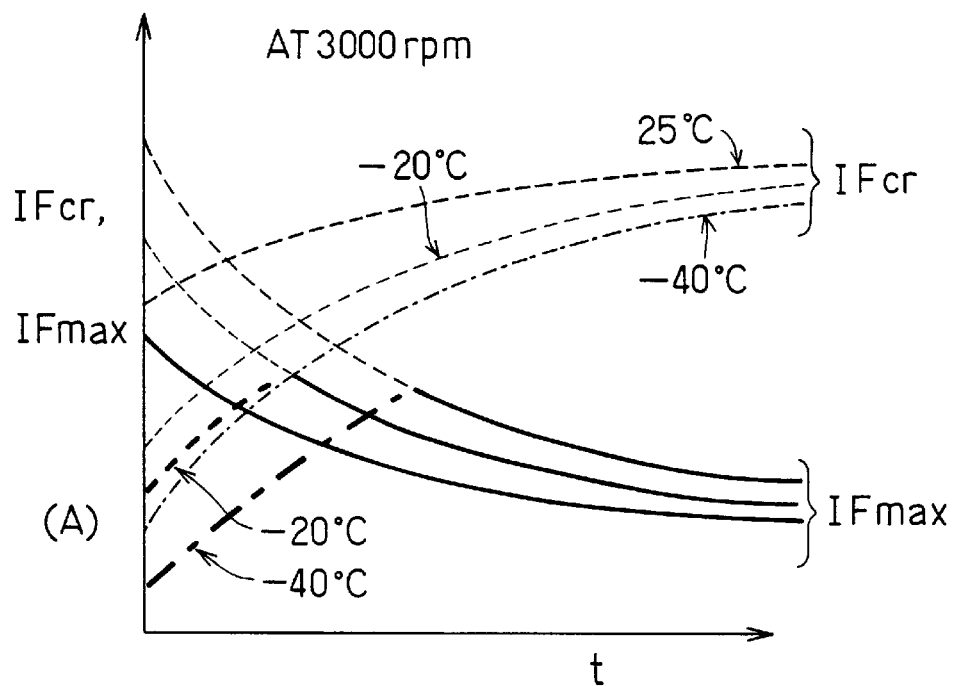
FIG. 10 is a graph showing relationship between passing time after start of generation, critical demagnetizing current and maximum field current to be supplied to the field coil at various ambient temperatures.

FIG. 10 shows a graph showing relationship between the passing time t after the start (key-on time) of the generation and the maximum allowable field current IFmax as well as the critical demagnetizing current IFcr when the rotation speed Na is 3000 rpm (constant), and the ambient temperature T is set to 25° C., –20° C. and –40° C., respectively. The permanent magnets 8 are made of ferrite magnet material. A thick broken line and one-dot-chain line indicate the maximum allowable field current limited by the above operation at the ambient temperatures of –20° C. and –40° C. respectively.

Figure 11:
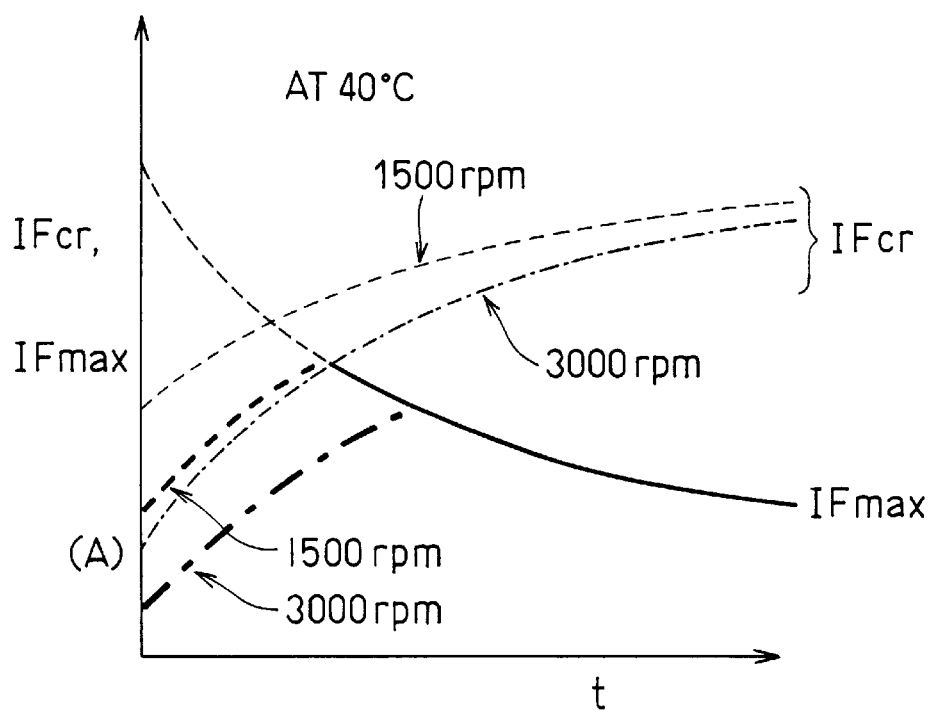
FIG. 11 is a graph showing relationship between passing time after start of generation, critical demagnetizing current IFcr and maximum field current IFmax to be supplied to the field coil at various rotation speeds of a generator.

FIG. 11 shows a graph showing relationship between the passing time t after the start of the generation and the maximum allowable field current IFmax as well as the critical demagnetizing current IFcr when the rotation speed Na is 1500 rpm and 3000 rpm, and the temperature T is –40° C. The permanent magnets 8 are made of ferrite magnet material. A thick broken line and a one-dot-chain line indicate the maximum allowable field current IFmax limited by the above operation at the rotation speeds of 1500 rpm and 3000 rpm.

Since the permanent magnets 8 is heated gradually after operating the generator 1, the field current is not controlled a certain time after the operation.

Because the maximum allowable field current IFmax at a higher temperature range becomes larger as shown in FIGS. 10 and 11, the size of the permanent magnets 8 can be more compact or the output power of the generator 1 can be increased more if the field current at cold temperature is limited within the maximum allowable current IFmax. Even when the field current is controlled by the field-current limiting circuit, the field current IF is sufficient for the generator 1 to charge the battery 5 at the idling speed. The output power of the generator 1 can be increased drastically in a few minutes after the operation of the generator. The field current (IF at the right side of FIGS. 10 and 11 is equal to IFmax) gradually decreases with time as shown in FIGS. 10 and 11 because the resistance of the field coil increases as the temperature rises.

Figure 12:
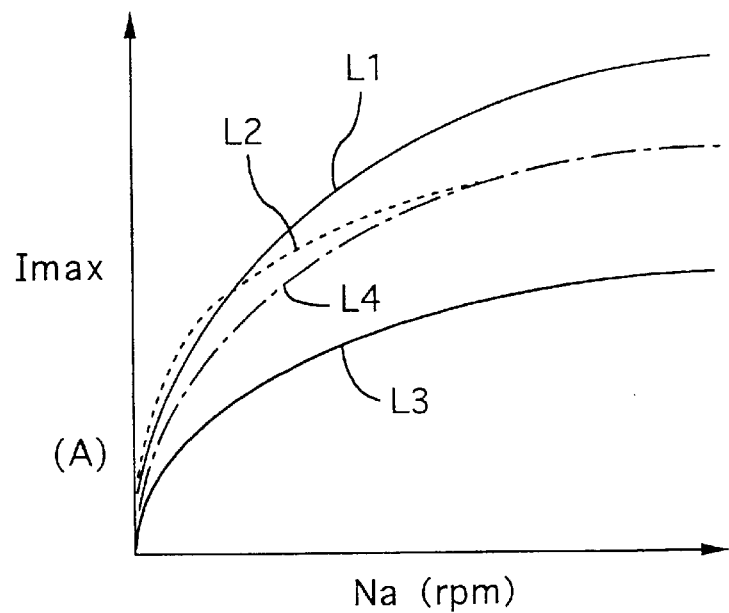
FIG. 12 is a graph showing relationship between the rotation speed and maximum output current of the generator at various ambient temperatures according to the fifth embodiment.

FIG. 12 shows relationship between the rotation speed Na and maximum output current Imax of the generator 1.

A curve L1 shows a relationship between the rotation speed Na and the maximum output current Imax when the irreversible demagnetization control is carried out at temperature of 25° C.; a curve L2 shows a relationship between the rotation speed Na and the maximum output current Imax when the irreversible demagnetization control is carried out at temperature of –20° C.; a curve L3 shows a relationship between the rotation speed Na and the maximum output current Imax when the irreversible demagnetization control is not carried out at temperature of 25° C.; and a curve L4 shows a relationship between the rotation speed Na and the maximum output current Imax when the irreversible demagnetization control is not carried out at temperature of –20° C.

It is understood from FIG. 12 that the curve L4 can not become higher than the curve L2 without the irreversible demagnetization control in order to prevent the demagnetization.

That is, the output current of a generator without the irreversible demagnetization control is smaller than that having the irreversible demagnetization control because the maximum allowable field current can not be increased as the temperature of the permanent magnet rises. In other words, if the field current of the generator without the control at the cold temperature is set to be as large as the field current of the generator with the control, the permanent magnet should be demagnetized and reduce the output current significantly. The output current of the former generator reduces further as the temperature rises and resistance of the field coil increases.

Sixth Embodiment

Figure 13:
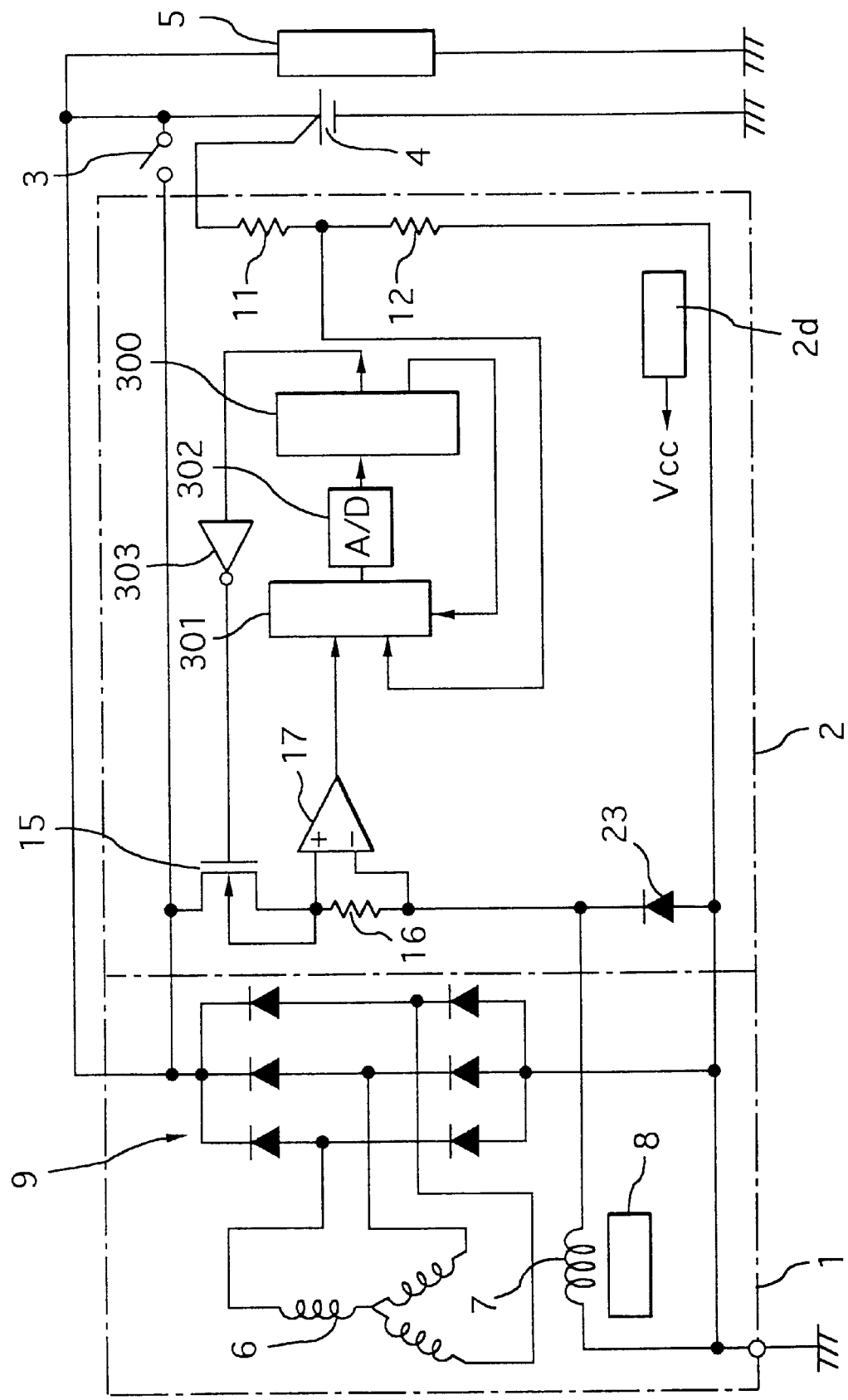
FIG. 13 is a circuit diagram of a generating system according to a sixth embodiment of the present invention.

A sixth embodiment of the present invention is described with reference to FIG. 13.

Figure 8:
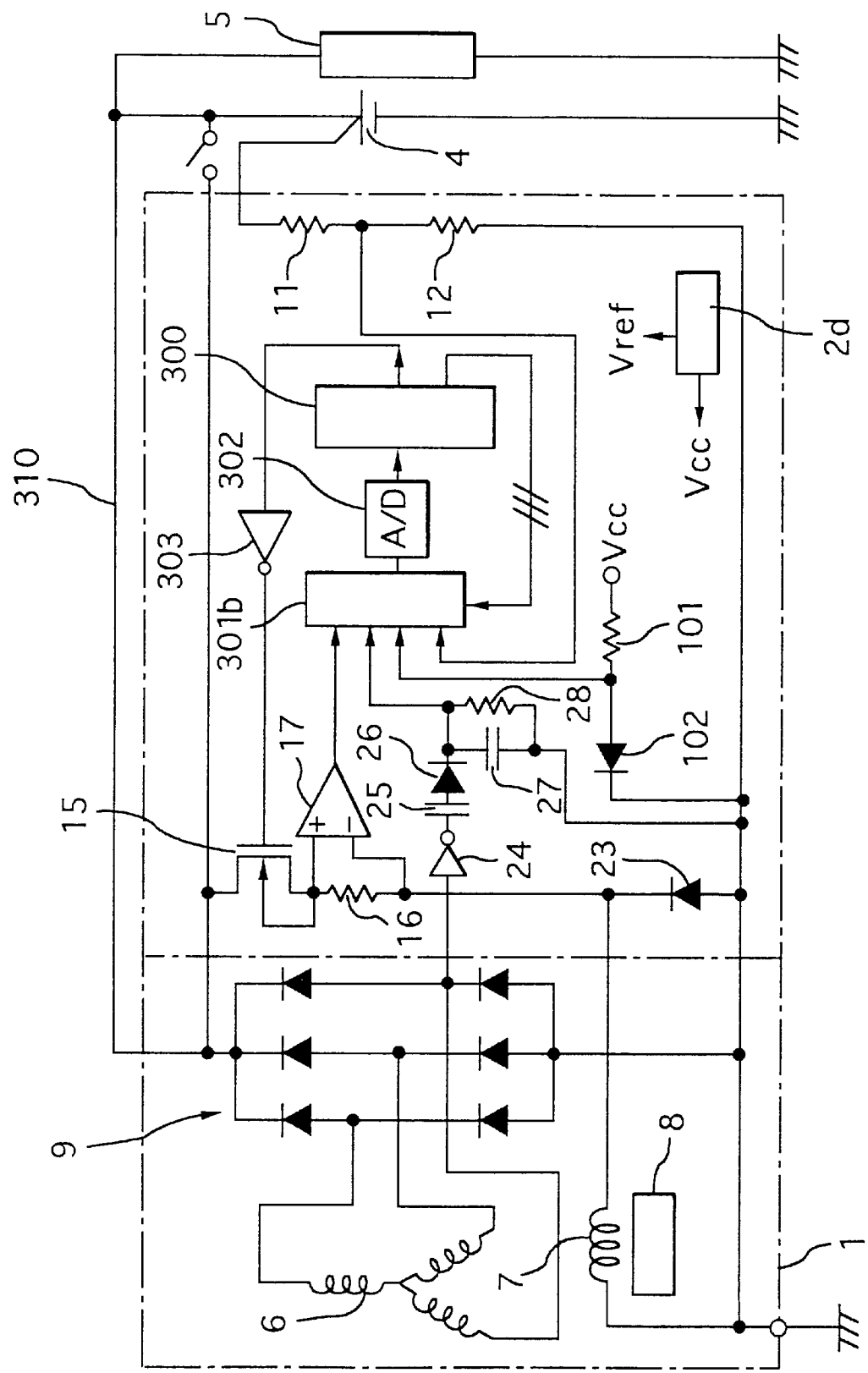
FIG. 8 is a circuit diagram of a generating system according to a fifth embodiment of the present invention.

In this embodiment, the temperature detecting diode 102, resistor 101, inverter 24 for detecting the rotation speed, capacitors 25 and 27, diode 26 and resistor 28 of the fifth embodiment shown in FIG. 8 are omitted. The permanent magnets 8 are made of ferrite magnet material.

The operation of this circuit is described with reference to a flow chart shown in FIG. 14.

Figure 15:
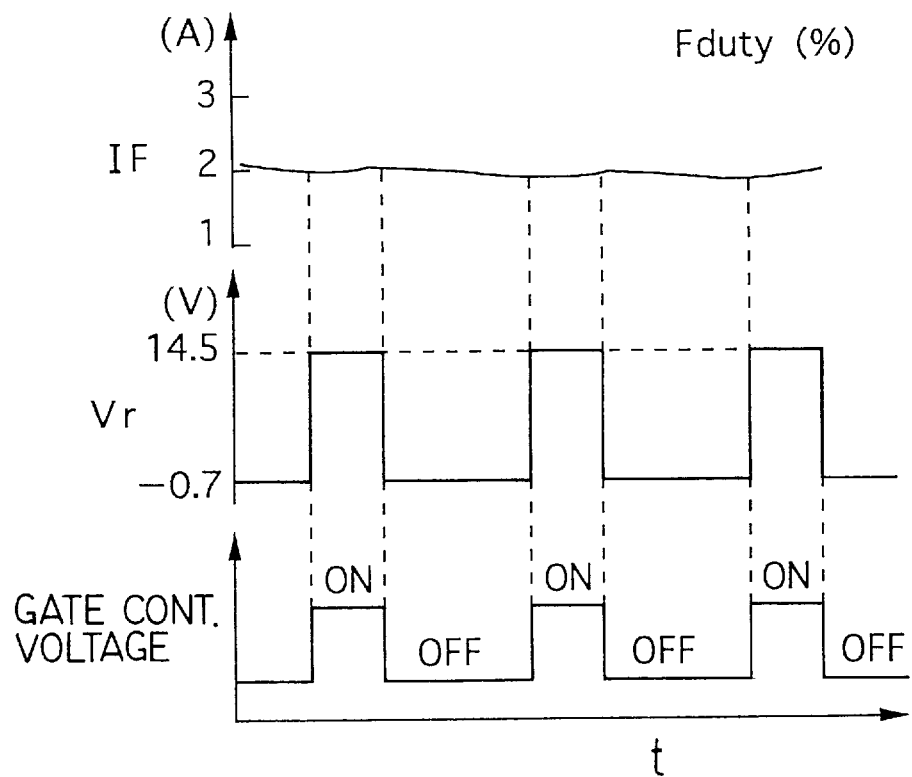
FIG. 15 is a timing chart showing relationship between the gate control voltage of a transistor and a voltage drop of a field coil in the operation of the generating system according to the sixth embodiment.

The initial setting is executed in a step S301, in which the duty ratio D of the transistor 15 is set to 25%. Subsequently, the battery voltage Vb is read in a step S302. The carrier frequency for the PWM control by the transistor 15 and frequency of the gate control voltage Vc of the transistor 15 as well as the field-coil-driving voltage Vr are high enough to follow changes in the field current IF as shown in FIG. 15. The duty ratio D is set to a value so that the field current can not cause the irreversible demagnetization even at temperature of −40° C.

In the next step S303, a first compensation value of the duty ratio ΔD1 is calculated from the product of a difference between the battery voltage Vb and the reference voltage Vref and a constant k1. Subsequently, the maximum allowable field current corresponding to the present duty ratio D is selected from a table which is stored beforehand (S304).

The relationship between the duty ratio D of the table and the maximum allowable field current is described hereafter.

With an average of the field current IF, a maximum (uncontrolled) field current IF'max, a field coil voltage drop Vr, resistance of the field coil (copper wire) r, a resistance ro of the field coil at temperature of 20° C., temperature t, the following relationship is established:

$$IF/D = IF'max = Vr/r$$

$$r = ro \cdot (234.5+t)/(234.5+20)$$

The relationship between the temperature of the ferrite magnet and the maximum allowable field current IFmax is expressed as follows:

$$IFmax = 0.06 \cdot t + 4.8 \text{ amperes (A)}$$

$$IFmax = (15.27/ro \cdot Vr \cdot D + (9.27/2)^2 - 9.27/2 \text{ amperes (A)}$$

That is, the field current to be controlled is given as a linear function of the duty ratio D.

The present field current IF is detected by the comparator 17 (S305) and is compared with the maximum allowable field current IFmax (S306). If the present field current IF is larger than the maximum allowable field current IFmax, a second compensation of the duty ratio ΔD2 is calculated from the product of a constant k2 and the difference between both values (IF−IFmax) in a step S307, and the next step S309 follows. Otherwise, the first compensation ΔD1 is deducted from the duty ratio D to reduce the field current IF (S308).

In the step S309, the first and second compensations ΔD1 and ΔD2 are compared to select a larger one to be deducted from the duty ratio D, thereby obtaining the next duty ratio to control the transistor 15 (S310).

Thus, the maximum allowable field current IFmax is calculated from the present duty ratio D (S304) accurately at various temperatures.

If the present field current IF is larger than the maximum allowable field current IFmax, a larger one of the first and second compensations ΔD1 and ΔD2 is deducted from the present duty ratio D. The first compensation ΔD1 is a value corresponding to a difference between the battery voltage Vb and reference voltage Vref1, and the second compensation ΔD2 is a value corresponding to a difference between the field current IF and the maximum allowable field current IFmax.

The output voltage is always regulated to the regular battery voltage irrespective of whether the field current is controlled within the maximum allowable field current Imax or not.

Figure 16:
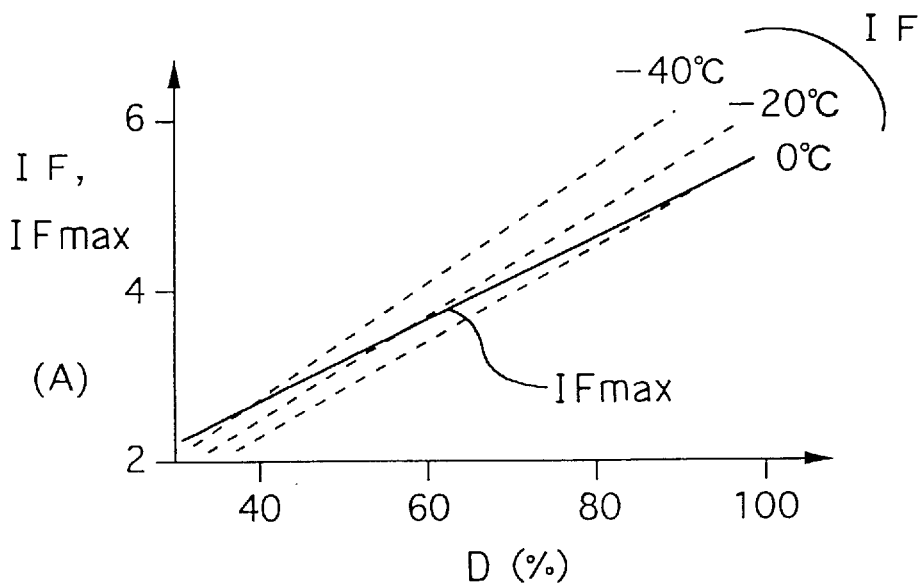
FIG. 16 is a graph showing relationship between the duty ratio, uncontrolled field currents at various temperatures and field current controlled within the critical demagnetizing current.

FIG. 16 is a graph showing relationship between the duty ratio D and the actual field current IF at different temperature as well as the maximum allowable field current IFmax. Here, the voltage drop of the field coil Vr is 12 V, the resistance of the field coil at a temperature of 20° C. is 2.3 ohm.

Seventh Embodiment

Figure 17:
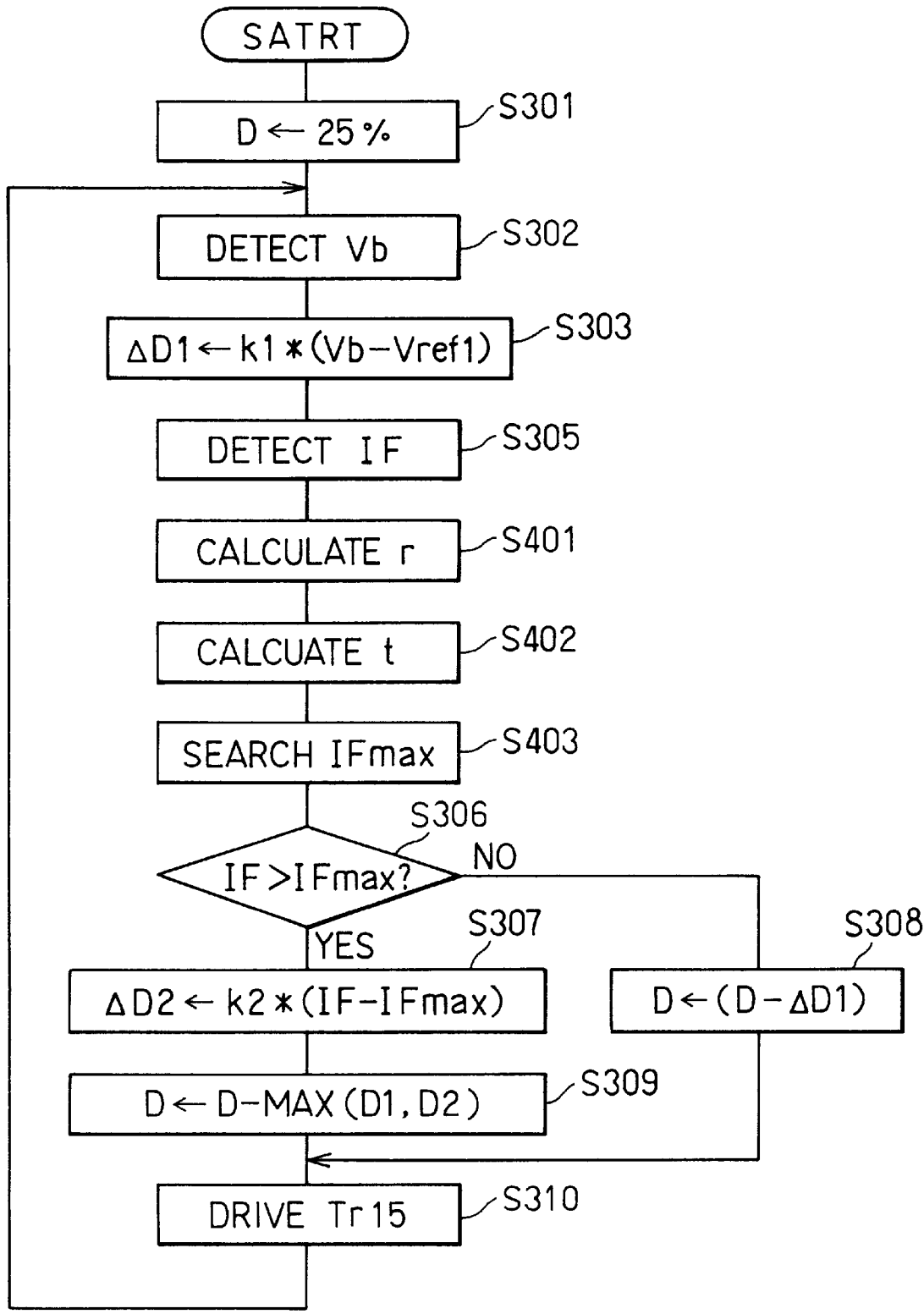
FIG. 17 is a flow chart showing operation of the microcomputer of a generating system a seventh embodiment.

Another embodiment of the present invention is described with reference to FIG. 17.

Figure 14:
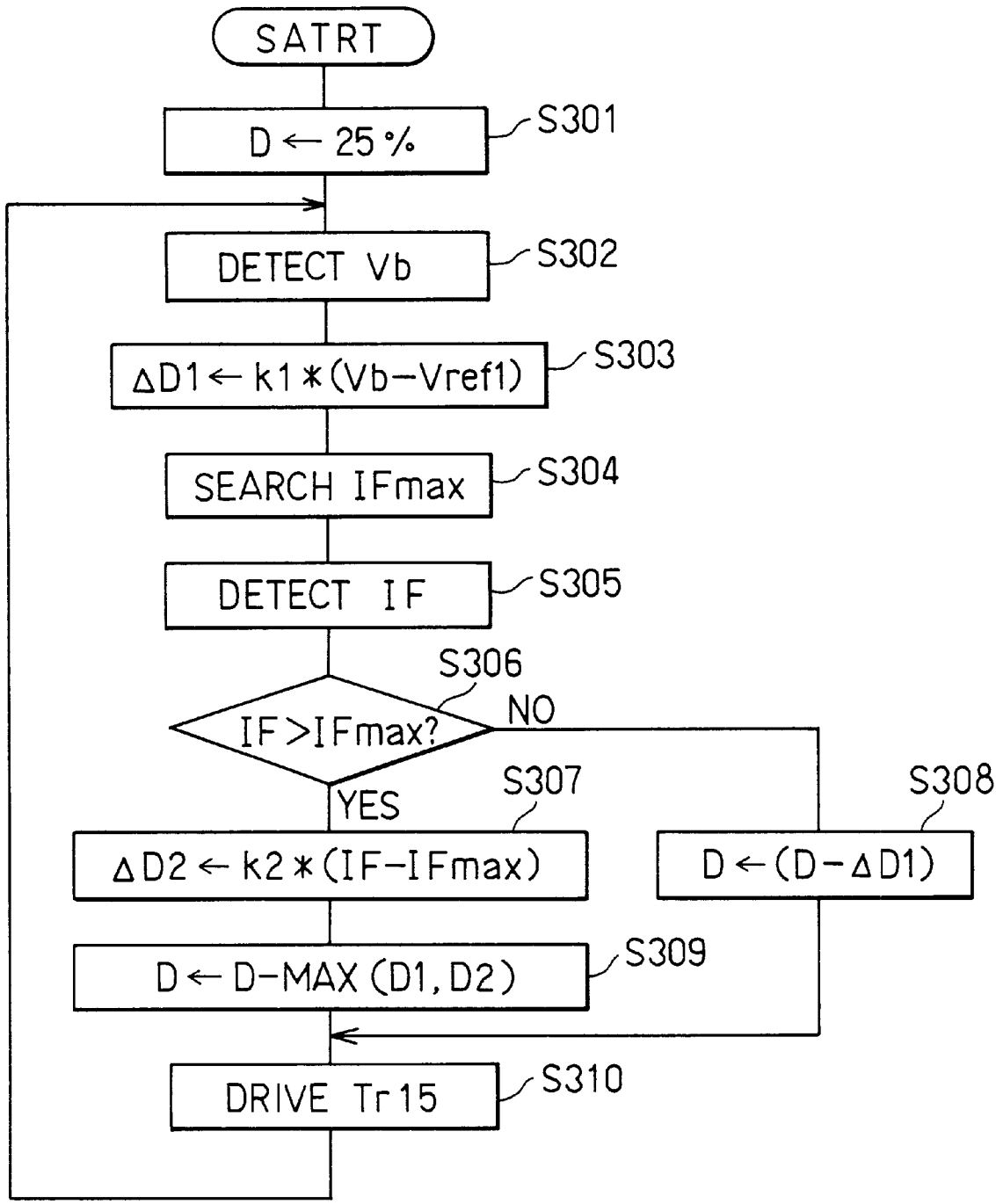
FIG. 14 is a flow chart showing operation of the microcomputer of the sixth embodiment.

The main feature is providing steps S401–S403 instead of the step S304 shown in FIG. 14 in which the maximum allowable field current is calculated only from the duty ratio D.

That is, the resistance r of the field coil is calculated (S401) based on the following expression:

$$r = Vr/IF/D$$

The temperature of the field coil (made of copper wire) is calculated from a present resistance r of the field coil and a resistance ro at a temperature of 20° C. (S402). Accordingly, the resistance is obtained as follows:

$$r = ro \cdot (234.5t)/(234.5+20)$$

The maximum allowable field current is read from a table of the relationship between the temperature of the ferrite magnet and the maximum allowable field current Imax stored in a memory by detecting the temperature t of the field coil (or the rotor temperature) obtained in the step S402.

The maximum uncontrolled field current IF'max is decided from the resistance of the field coil by a simple step.

Figure 18:
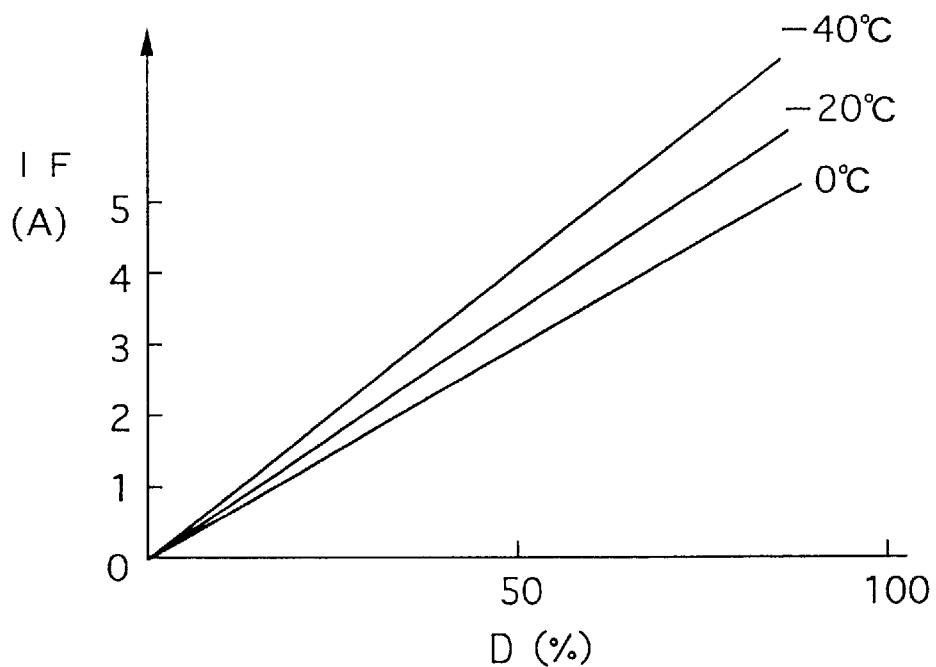
FIG. 18 is a graph showing relationship between the duty ratio D and field current with variations of temperatures of the field coil of the generating system according to the seventh embodiment.

FIG. 18 is a graph showing relationship between the duty ratio D and the field current IF with variation of the temperatures of the field coil, where the voltage drop Vr of the field coil is 12 V and the resistance of the field coil at temperature of 20° C. is 2.3 ohm.

Figure 19:
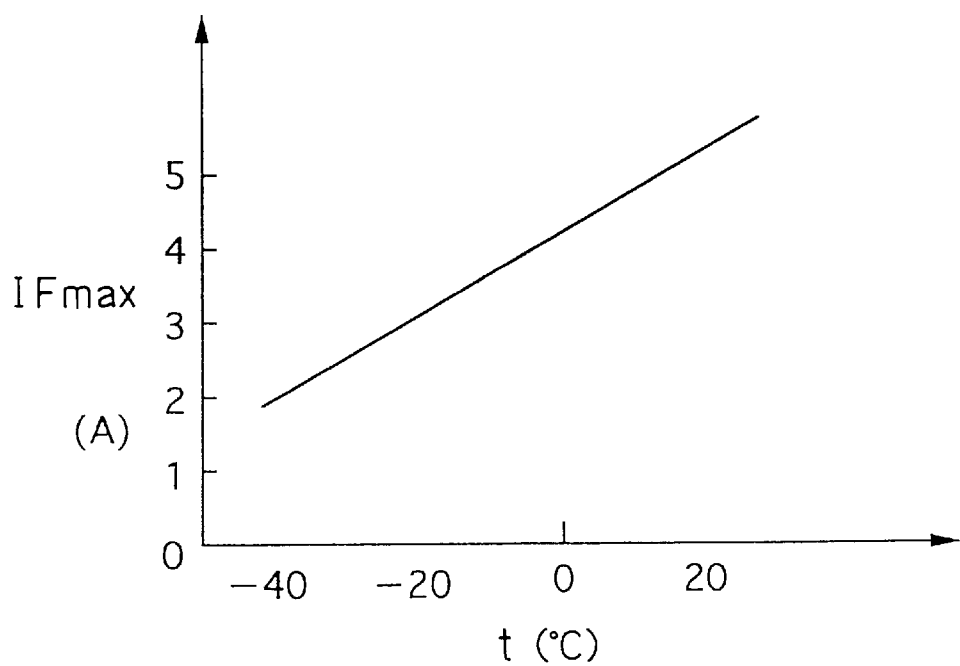
FIG. 19 is a graph showing relationship between the temperature of a ferrite magnet and critical demagnetizing field current of the generating system according to the seventh embodiment.

FIG. 19 is a graph showing relationship between the temperature of the ferrite magnet and the maximum allowable field current.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A generating system comprising;
    a generator including first means for providing a magnetic field having a permanent magnet therein, an armature coil, and a voltage regulator; and
    a second means for controlling said magnetic field within such an amount as not to cause irreversible demagnetization of said permanent magnet wherein
        said first means further comprises a field coil, and
        second means comprises a third means for detecting an indication related to said irreversible demagnetization of said permanent magnet and a current limiting unit for limiting field current supplied to said field coil according to said indication,
        said third means includes means for detecting temperature of said permanent magnet, and
        said current limiting unit reduces said field current as said temperature becomes lower.

2. A generating system as claimed in claim 1, wherein said third means includes means for detecting temperature of said voltage regulator.

3. A generating system as claimed in claim 1, wherein said third means includes means for detecting passing time after starting generation of said generator.

4. A generating system as claimed in claim 1, wherein said permanent magnet is disposed in magnetic field generated by said field coil.

5. A generating system as claimed in claim 4, wherein said permanent magnet is disposed to increase effective magnetic flux interlinking said armature coil.

6. A generating system as claimed in claim 4, wherein said third means includes means for detecting current supplied to said field coil.

7. A generating system as claimed in claim 1, wherein said permanent magnet supplies said armature coil with effective magnetic flux.

8. A generating system as claimed in claim 4, wherein said third means includes means for detecting output current of said generator, and
said current limiting unit reduces said current to be supplied to said field coil when said output current increases.

9. A generating system as claimed in claim 8, wherein said third means includes means for detecting rotation speed of said generator, and
said current limiting unit reduces current to be supplied to said field coil when said rotation speed increases.

10. A generating system as claimed in claim 1, wherein said generator is an alternator for a vehicle.

11. A generating system as claimed in claim 1, wherein said current limiting unit limits current to be supplied to said field coil within a maximum field current of said generator which operates at high temperature condition.

12. A generating system comprising;
a generator including first means for providing a magnetic field having a permanent magnet therein, an armature coil, and a voltage regulator; and
a second means for controlling said magnetic field within such an amount as not cause irreversible demagnetization of said permanent magnet wherein
said first means further comprises a field coil, and
second means comprises a third means for detecting an indication related to said irreversible demagnetization of said permanent magnet and a current limiting unit for limiting field current supplied to said field coil according to said indication,
said current limiting unit comprises a switch for on-off-controlling said field current according to said indication, and
further comprising a voltage regulator, wherein said voltage regulator includes said switch and controls output voltage of said generator to a preset value by controlling duty ratio of said switch;
said third means detects said field current and said duty ratio; and
said current limiting unit limits said field current within a maximum value of said field current that can prevent irreversible demagnetization according to said duty ratio.

13. A generating system as claimed in claim 12, wherein said current limiting unit limits an increasing rate of said duty ratio within an increased rate of said field current.

14. A generating system as claimed in claim 12, wherein said permanent magnet is made of material which is demagnetized at a cold temperature, and
said current limiting unit reduces said field current more as said duty ratio increases.

15. A generating system as claimed in claim 12, wherein said current limiting unit limits said field current according to said duty ratio and said field current.

16. A generating system as claimed in claim 15, wherein said means for detecting an indication comprises means for detecting a voltage drop of said field coil when said switch turns on, and
said current limiting unit limits said field current according to temperature which is calculated from said duty ratio, said field current and said voltage drop.

17. A generating system as claimed in claim 16, wherein said permanent magnet is made of material which is demagnetized at a cold temperature, and
said current limiting unit reduces said field current more as said calculated temperature lowers.

18. A generating system as claimed in claim 14, wherein said field current is set to such an amount that said irreversible demagnetization of said permanent magnet is not likely at a lowest ambient temperature in use and said generator generates output current at a preset rotation speed.

19. A generating system as claimed in claim 18, wherein said preset rotation speed is an idle speed of an engine of said vehicle.

20. A generating system as claimed in claim 14, wherein said field current is less than a maximum field current of said generator at a highest operating temperature.

21. A generating system as claimed in claim 12, wherein said current limiting unit limits an increase rate of said duty ratio so that said irreversible demagnetization due to delay in transmitting heat from said field coil to said permanent magnet can be prevented.

22. A generating system comprising;
a generator including first means for providing a magnetic field having a plurality of poles, a field coil and a permanent magnet therein and an armature coil; and
a second means for controlling said magnetic field within such an amount as not to cause irreversible demagnetization of said permanent magnet; said second means including a third means for detecting an indication related to said irreversible demagnetization of said permanent magnet and a current limiting unit for limiting field current supplied to said field coil according to said indication; wherein
said permanent magnet is disposed between said poles, said poles comprises claw poles; and said permanent magnet is disposed in parallel with said field coil,
said permanent magnet is disposed between an adjacent two of said claw poles, and
said third means includes means for detecting temperature of said permanent magnet, and
said current limiting unit reduces said field current as said temperature becomes lower.

* * * * *